United States Patent
Hellyer et al.

Patent Number: 5,180,144
Date of Patent: Jan. 19, 1993

[54] AIR SPRING MODULE FOR A DAMPER

[75] Inventors: Richard A. Hellyer, Huber Heights; James R. Wagner; James M. Pees, both of Centerville, all of Ohio; Detlef Lohmann, Paris, France

[73] Assignee: General Motors Corporation, Detroit, Mich.

[21] Appl. No.: 752,366

[22] Filed: Sep. 3, 1991

[51] Int. Cl.[5] .......................... F16F 9/04; F16F 9/43; B60G 17/00

[52] U.S. Cl. .............................. 267/64.19; 267/64.28; 280/668

[58] Field of Search ............... 267/64.19, 64.21, 64.22, 267/64.24, 33; 188/322.17, 322.18; 280/672, 693, 668

[56] References Cited

U.S. PATENT DOCUMENTS

| | | | |
|---|---|---|---|
| 3,954,257 | 5/1976 | Keigzer et al. | 267/64.21 |
| 4,332,397 | 6/1982 | Steger | 280/693 |
| 4,555,096 | 11/1985 | Pryor | 267/8 R |
| 4,659,070 | 4/1987 | Buma | 267/64.25 |
| 4,712,776 | 12/1987 | Geno et al. | 267/64.21 |
| 4,911,416 | 3/1990 | Warmuth, II | 267/64.21 |
| 4,961,594 | 10/1990 | Pees | 280/672 |
| 4,971,296 | 11/1990 | Kondo | 280/668 |
| 4,988,082 | 1/1991 | Pees | 267/64.240 |
| 4,989,844 | 2/1991 | Wijnhoven et al. | 267/64.24 |

FOREIGN PATENT DOCUMENTS 0318696  6/1989  European Pat. Off. ......... 267/64.21

Primary Examiner—Robert J. Oberleitner
Assistant Examiner—Chris Schwartz
Attorney, Agent, or Firm—A. Michael Tucker

[57] ABSTRACT

An air spring module is constructed and arranged to be removably mounted between a damper and a vehicular body. The module includes a bored contact piston which is slip fitted over a reciprocable piston rod of the damper. A retaining ring releasably locks the contact piston to the damper, and O-ring seals provide a seal between the contact piston and the damper. An air sleeve is secured at its lower end to the contact piston and is secured at its upper end to a canister. A bearing assembly and mount rotationally and removably secures the canister to the body.

13 Claims, 1 Drawing Sheet

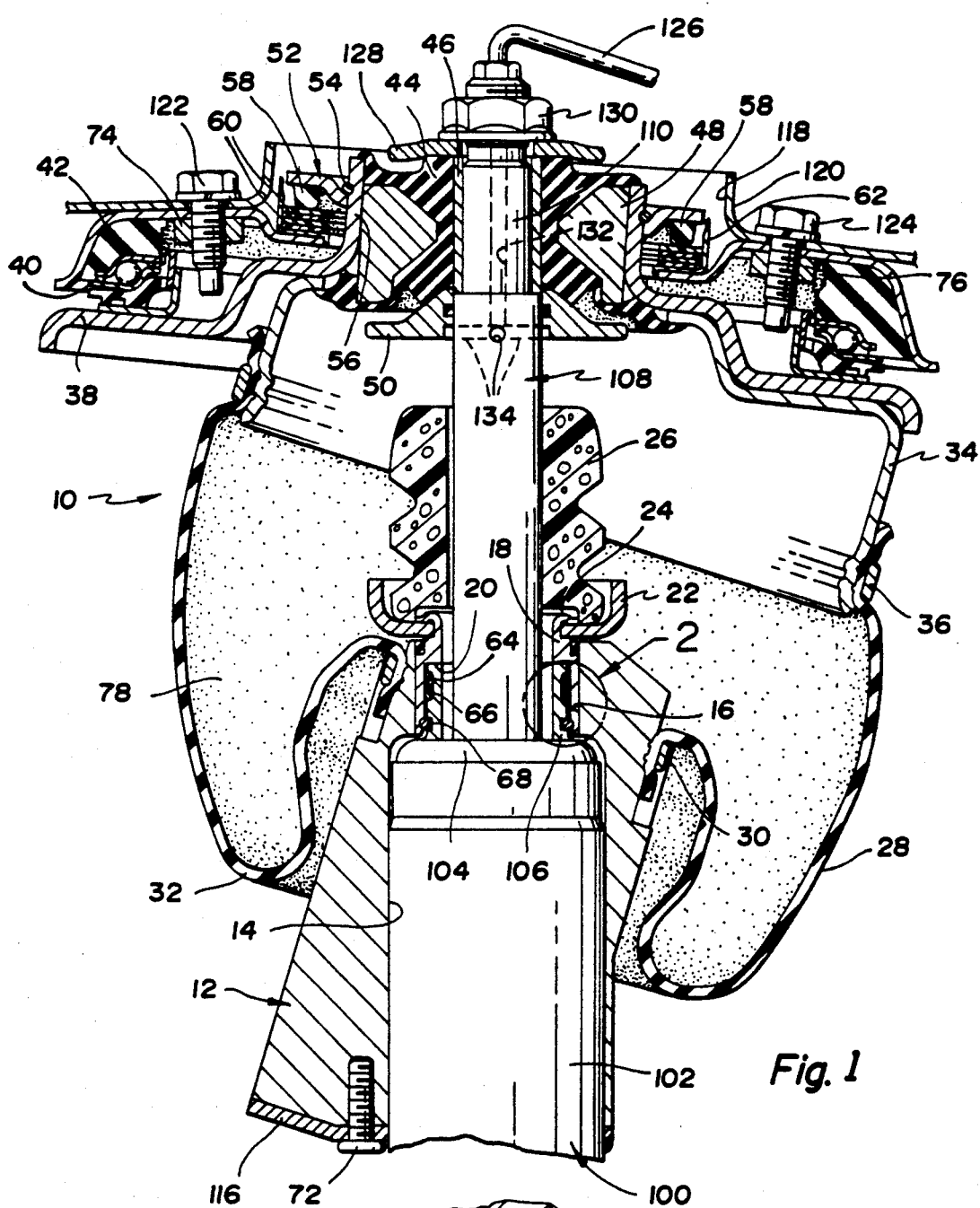
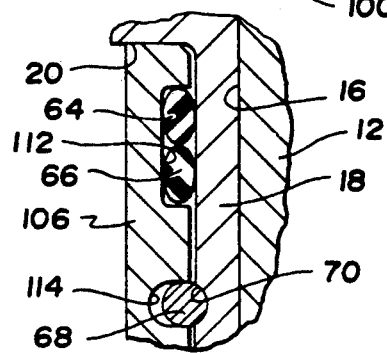
Fig. 1
Fig. 2

AIR SPRING MODULE FOR A DAMPER

BACKGROUND OF THE INVENTION

1. Field of the Invention

This invention relates to vehicle suspension and, in particular, is concerned with an air spring module for use with a damper.

2. Description of the Related Art

Automotive suspension struts, such as used in MacPherson-type suspensions, are commonly constructed with either coil springs or air springs mounted coaxially about the strut. A particular problem is encountered by front suspension struts which are mounted to the front steerable wheels. When the wheels are steered, the spring undergoes a twisting movement as the strut body rotates with the wheel. Such twisting undesirably changes the characteristics of the coil spring. To solve the torsional twist of coil springs, a bearing assembly is placed between the vehicle body and a mounted piston rod of the strut to allow the strut to rotate relative to the body.

Air springs also are mounted about suspension struts alone or in combination with coil springs.

It is desirable when incorporating an air suspension spring on a MacPherson strut assembly to allow for replacement of the MacPherson strut without removal or disassembly of the air spring. In order to do this, the air spring should be detachable with respect to the strut body and the vehicle body.

SUMMARY OF THE INVENTION

The present invention includes an air spring module mounted about a suspension damper. The module includes means for removably securing the air spring to the damper body and a bearing and mounting assembly for permitting the rotation of the air spring with respect to the vehicle body as the damper body rotates during steering. The module can be used with a sealed damper.

In a preferred embodiment, an air spring module is constructed and arranged to be removably mounted between a damper and a vehicular body. The module includes a bored contact piston which is slip fitted over a reciprocable piston rod of the damper. A retaining ring releasably locks the contact piston to the damper, and 0-ring seals provide a seal between the contact piston and the damper. An air sleeve is secured at its lower end to the contact piston and is secured at its upper end to a canister. A bearing assembly and mount rotationally and removably secures the canister to the body.

BRIEF DESCRIPTION OF THE DRAWINGS

FIG. 1 is a longitudinal sectional view of an air spring module according to the present invention mounted at its upper end to a vehicle body and removably secured to a damper at its lower end.

FIG. 2 is an enlarged view of a portion of the assembly illustrated in the circle of FIG. 1.

DETAILED DESCRIPTION OF THE PREFERRED EMBODIMENT

An air spring module indicated generally at 10 is illustrated in FIG. 1. As described below, the module 10 is removably mounted on a damper 100. The damper 100 includes an outer reservoir tube 102 closed at its upper end by a seal cover 104. An upstanding neck 106 of the seal cover 104 receives a reciprocable piston rod 108 extending from the damper 100. The lower end (not illustrated) of the damper 100 is mounted to a wheel assembly (not illustrated) in a conventional manner.

The module 10 includes a profiled contact piston 12 which is generally cylindrical and has an increased diameter at its lower portion. The piston 12 includes a stepped bore having a large diameter portion 14 and a small diameter portion 16. The reservoir tube 102 is received in the large diameter portion 14 and the neck 106 and piston rod 108 fit in the small diameter portion 16. A retaining sleeve 18 is press fitted into the small diameter portion 16 and includes an annular stop 20 which engages the end surface of the neck 106. A cup 22 is retained to the sleeve 18 by a crimped flange 24 and secures an elastomeric compression bumper 26 coaxially mounted about the piston rod 108.

An elastomeric air sleeve 28 is attached to the outer circumference of the contact piston 12 by a clamp or retainer 30. A rolling lobe 32 is formed in a portion of the sleeve 28 which travels along the contact piston 12 in a well-known manner. The upper portion of the sleeve 28 is secured to a partially-cylindrical canister 34 by a clamp or retainer 36. The canister 34 is welded to a lower bearing retainer 38. An elastomerically-isolated bearing assembly 40 is provided between the lower bearing retainer 38 and an upper bearing retainer 42. An elastomeric mount 44 includes a cylindrical sleeve 46 which is fitted over a stepped portion 110 of the piston rod 108. A metallic ring 48 is provided about the mount 44 and welded to the lower bearing retainer 38 to secure the mount 44. A lower rate washer 50 is secured to the sleeve 46 at a lower surface of the mount 44. A plate 52 is connected to the lower bearing retainer 38 by a retainer ring 54 received in a groove in the outer circumference of a neck portion 56 of the lower bearing retainer 38. The plate 52 includes a plurality of downwardly projecting preloaded rubber pads 58. The pads 58 rest on a plurality of thrust washers 60, preferably formed from low friction materials such as polytetrafluoroethylene. The thrust washers are concentrically mounted about the neck 56 of the lower bearing retainer 38 and are held in place by a support 62 secured to the upper bearing retainer 42.

The module 10 described above can be mounted on any type of damper, including hydraulic and pneumatic dampers. To assemble the module 10 in a vehicle, the contact piston 12 is fitted over the piston rod 108 and reservoir tube 102 via the stepped bore. A pair of O-ring seals 64, 66 are provided in a first circumferential groove 112 in the neck 106 of the seal cover 104 to provide a seal between the sleeve 18 and the neck 106. A retainer ring 68 is mounted in a second circumferential groove 114 of the neck 106 and is initially compressed as the sleeve 18 is slid over the neck 106. A complementary groove 70 is provided in an inner surface of the sleeve 18 so that the retainer ring 68 springs outwardly and fits snugly into the groove 70 when the contact piston 12 is in its proper position. This construction provides a quick and removable connection between the lower end of the module 10 and the damper 100.

A fastener 72 removably mounts the contact piston 12 to a support plate 116 welded to an outer surface of the reservoir tube 102. The damper 100 and air spring module 10 are then inserted upwardly through an opening 118 in a vehicle body 120. Fasteners 122, 124 are inserted through openings in the body 120 and threaded into complementary nuts 74, 76 welded to a lower surface of the upper bearing retainer 42. In this manner, the upper end of the air spring module 10 is removably connected to the body 120. A conduit assembly 126 and a washer 128 are secured to the upper end of the piston rod 108 by a nut 130. The conduit assembly 126 is in fluid communication with a compressor (not illustrated) to operate the air spring module 10 as desired. The compressor can include valving to control the flow of fluid into and out of the conduit assembly 126.

An axial bore 132 is provided in the piston rod 108 beginning at its upper end to a point below the lower rate washer 50. A plurality of radial bores 134 are provided at the lower end of the axial bore 132 to provide a fluid flow path from the conduit assembly 126 to an air chamber 78 formed by the air sleeve 28. During use, a control system (not illustrated) can add air to the air chamber 78 through the axial and radial bores 132, 134 as desired. The module 10 is effectively sealed from the damper 100.

As the damper 100 is turned at its lower end from a steering input, the contact piston 12 and attached air sleeve 28 and lower bearing retainer 38 rotate with the damper 100. The bearing assembly 40 permits relative rotation of the lower bearing retainer 38 with respect to the upper bearing retainer 42 and the vehicle body 120. The preloaded rubber pads 58 provide isolation and support against the thrust washers 60 for the module 10 as the lower bearing retainer 38 rotates.

It will be appreciated that the air spring module 10 can be used with any type of damper, including shock absorbers and struts. The module 10 is easily removed from the damper 100 by removing the fastener 72 and forcing the contact piston 12 upwardly away from the reservoir tube 102. At this point, the retainer ring 68 is compressed into the groove 114 until the sleeve 18 clears the neck 106 of the seal cover 104. Removing fasteners 122, 124 from the body 120 frees the upper end of the air module 10. Therefore, if a damper 100 becomes defective, it will be necessary only to replace the damper 100, and the air spring module 10 can be retained. On the other hand, if the air spring module 10 is damaged, e.g., if the air sleeve 28 becomes punctured, the damper 100 can be easily removed, permitting the air spring module 10 to be replaced.

Although the present invention has been described with reference to preferred embodiments, workers skilled in the art will recognize that changes may be made in form and detail without departing from the spirit and scope of the invention.

The embodiments of the invention in which an exclusive property or privilege is claimed are defined as follows:

1. A vehicular suspension assembly comprising:
   (a) a hydraulic damper having a telescopic piston rod projecting from a neck;
   (b) a profiled contact piston;
   (c) a stepped bore through the contact piston including a larger diameter portion for receiving the damper and a small diameter portion for receiving the neck and the piston rod;
   (d) a retaining sleeve secured to the small diameter portion of the contact piston;
   (e) seal means provided in a first circumferential groove on the neck;
   (f) a retainer ring provided in a second circumferential groove on the neck;
   (g) a groove provided in an inner surface of the retaining sleeve for receiving the retainer ring when the contact piston is mounted on the damper so that no part of the retainer ring is exposed to an outer surface of the contact piston;
   (h) an electomeric sleeve air sleeve sealed at a lower end to the contact piston and sealed at an upper end to a canister; and
   (i) means for rotatably mounting the canister to a vehicular body.

2. The assembly specified in claim 1 wherein the means for rotatably mounting the canister includes:
   (a) a bearing assembly;
   (b) a plurality of preloaded pads mounted on a plate concentrically mounted about the piston rod; and
   (c) a plurality of thrust washers provided between the pads and the bearing assembly.

3. A vehicular suspension system comprising:
   (a) a rotatable, sealed damper having a reciprocating piston rod projecting from an upper end thereof;
   (b) an air spring module removably mounted at one end to the damper and removably mounted at the opposite end to a vehicle, the module including a contact piston fitted on the piston rod and an upper end of the damper;
   (c) a retaining ring provided between the upper end of the damper and the contact piston to releasably lock the contact piston to the damper;
   (d) seal means for providing a seal between the air spring module and the damper;
   (e) means for permitting the air spring module to rotate with respect to the vehicle when the damper is rotated including a bearing assembly having upper and lower retainers; and
   (f) means attached to the air spring module to isolate the module from the bearing assembly including a plate having a plurality of preloaded pads engageable with the upper retainer of the bearing assembly.

4. The system specified in claim 3 including:
   (a) bore means in the piston rod in communication with an interior of the air spring module; and
   (b) means for controlling airflow through the bore means.

5. The system specified in claim 3 including a plurality of thrust washers provided between the pads and the upper retainer.

6. An air spring module constructed and designed to be removably mounted between a damper and a body, the module comprising:
   (a) a contact piston having a bore for receiving the damper;
   (b) means for releasably mounting the contact piston on the damper;
   (c) an elastomeric air sleeve sealed at a lower end to the contact piston and sealed at an upper end to a canister; and
   (d) means for rotationally mounting the canister to the body including
      (i) a lower bearing retainer, attached to the canister, having a neck portion for receiving the damper,
      (ii) an upper bearing retainer removably attached to the body,
      (iii) a bearing assembly mounted between the upper and lower bearing retainers to permit rotation of the spring module with respect to the body, (iv) a plate removably attached to the neck portion above the lower bearing retainer, (v) a plurality of downwardly projecting preloaded pads on the plate, and (vi) a plurality of thrust washers provided between the pads and the upper bearing retainer.

7. The air spring module specified in claim 6 including means provided in the bore to provide a seal between the contact piston and the damper.

8. The air spring module specified in claim 6 wherein the plate removably attached to the neck of the lower bearing retainer extends in a plane substantially parallel to and above the upper bearing retainer.

9. The air spring module specified in claim 6 wherein the means for releasably mounting the contact piston on the damper is provided in the bore of the contact piston.

10. The air spring module specified in claim 9 wherein the means for releasably mounting the contact piston comprises:

(a) a groove provided on the outer circumference of the damper;

(b) a retainer ring provided in the damper groove; and (c) a complementary groove provided on the inner surface of the bore, whereby the retainer ring is compressed radially inwardly as the contact piston bore initially receives the damper and then springs radially outwardly to fit in the groove in the bore as the contact piston reaches its predetermined position.

11. The air spring module specified in claim 6 including a retaining sleeve press fitted in the bore of the contact piston.

12. The air spring module specified in claim 11 wherein the means for releasably mounting the contact piston on the damper is provided in an inner surface of the retaining sleeve.

13. The air spring module specified in claim 12 wherein the means for releasably mounting the contact piston comprises:

(a) a groove provided on the outer circumference of the damper;

(b) a retainer ring provided in the damper groove; and (c) a complementary groove provided on the inner surface of the retaining sleeve, whereby the retainer ring is compressed radially inwardly as the retaining sleeve initially receives the damper and then springs radially outwardly to fit in the groove in the retaining sleeve as the contact piston reaches its predetermined position.

* * * * *